(12) United States Patent
Zhang

(10) Patent No.: US 8,851,731 B2
(45) Date of Patent: Oct. 7, 2014

(54) LIGHT-DIFFUSION LED LAMP

(75) Inventor: Marcus Zhang, Yuyao (CN)

(73) Assignee: Ningbo Baishi Electric Co., Ltd, Yuyao (CN)

( * ) Notice: Subject to any disclaimer, the term of this patent is extended or adjusted under 35 U.S.C. 154(b) by 79 days.

(21) Appl. No.: 13/379,036

(22) PCT Filed: Oct. 25, 2011

(86) PCT No.: PCT/CN2011/081298
§ 371 (c)(1),
(2), (4) Date: Dec. 19, 2011

(87) PCT Pub. No.: WO2013/059994
PCT Pub. Date: May 2, 2013

(65) Prior Publication Data
US 2013/0100642 A1    Apr. 25, 2013

(30) Foreign Application Priority Data
Oct. 24, 2011 (CN) .......................... 2011 1 0326189

(51) Int. Cl.
| | | |
|---|---|---|
| *F21V 7/04* | (2006.01) | |
| *F21V 11/00* | (2006.01) | |
| *G02B 5/02* | (2006.01) | |
| *H01J 5/16* | (2006.01) | |
| *H01P 5/00* | (2006.01) | |
| *H01L 33/00* | (2010.01) | |
| *B29D 11/00* | (2006.01) | |
| *F21V 5/00* | (2006.01) | |
| *G02B 6/00* | (2006.01) | |
| *B60Q 1/06* | (2006.01) | |
| *F21V 29/00* | (2006.01) | |
| *F21V 3/00* | (2006.01) | |
| *F21K 99/00* | (2010.01) | |
| *F21V 9/16* | (2006.01) | |
| *F21Y 105/00* | (2006.01) | |
| *F21V 8/00* | (2006.01) | |
| *F21Y 101/02* | (2006.01) | |

(52) U.S. Cl.
CPC ... *F21V 9/16* (2013.01); *F21K 9/52* (2013.01); *F21Y 2105/001* (2013.01); *G02B 6/0008* (2013.01); *F21Y 2101/02* (2013.01); *F21K 9/56* (2013.01)
USPC ...... 362/558; 362/311.02; 362/555; 362/582; 362/373

(58) Field of Classification Search
USPC ............ 362/551–582, 294, 373, 218, 249.02, 362/311.02
See application file for complete search history.

(56) References Cited

U.S. PATENT DOCUMENTS 6,036,328 A *  3/2000  Ohtsuki et al. ................. 362/612
6,791,151 B2 * 9/2004  Lin et al. ........................ 257/434
(Continued)

*Primary Examiner* — Peggy Neils
*Assistant Examiner* — Erin Kryukova

(57) ABSTRACT

The light-diffusion LED lamp according to the present patent application includes LED blue light chips and light-guiding column, wherein a substrate of the LED blue light chips is provided with a blocking wall made of reflective heat-conducting materials, chips thereof are provided within the blocking wall, and the upper surface of the substrate within the blocking wall is covered with a transparent heat-conducting layer. The lower portion of the transparent light-guiding column is attached with a cover plate, the bottom surface of which is provided with stepped grooves that match with the LED blue light chips, the side wall of the second stepped groove thereof and the upper surface of the cover plate are provided with a light reflective layer, the top surface of which is covered with a fluorescent layer, and the top portion of the transparent light-guiding column has a reflective structure mounted thereon.

14 Claims, 3 Drawing Sheets

(56) References Cited

U.S. PATENT DOCUMENTS

| | | | |
|---|---|---|---|
| 7,070,304 B2 * | 7/2006 | Imai | 362/267 |
| 7,329,982 B2 * | 2/2008 | Conner et al. | 313/498 |
| 7,665,865 B1 * | 2/2010 | Hulse et al. | 362/277 |
| 7,938,550 B2 * | 5/2011 | Takenaka | 362/3 |
| 7,959,312 B2 * | 6/2011 | Yoo et al. | 362/84 |
| 7,988,336 B1 * | 8/2011 | Harbers et al. | 362/294 |
| 8,292,471 B2 * | 10/2012 | Boonekamp et al. | 362/311.02 |
| 8,573,823 B2 * | 11/2013 | Dau et al. | 362/560 |
| 2006/0239006 A1 * | 10/2006 | Chaves et al. | 362/294 |
| 2006/0245194 A1 * | 11/2006 | Kikuchi et al. | 362/257 |
| 2008/0170392 A1 * | 7/2008 | Speier et al. | 362/227 |
| 2008/0191620 A1 * | 8/2008 | Moriyama et al. | 313/506 |
| 2008/0192458 A1 * | 8/2008 | Li | 362/84 |
| 2009/0052157 A1 * | 2/2009 | Katabe | 362/84 |
| 2010/0188839 A1 * | 7/2010 | Li | 362/84 |
| 2011/0198631 A1 * | 8/2011 | Lerman et al. | 257/91 |
| 2012/0069547 A1 * | 3/2012 | Gielen et al. | 362/84 |

* cited by examiner

LIGHT-DIFFUSION LED LAMP

FIELD OF THE PATENT APPLICATION

The present patent application relates to illumination technical field, more particularly, to a light-diffusion LED lamp.

BACKGROUND

LED lamps, emitting light through a light-emitting diode, is a solid semiconductor device per se and can directly transform electric energy into light. LED lamps have been widely applied for possessing characteristics of high luminous-efficacy, low power-consumption, long work-duration, easy controllability, maintenance-free and safety and environmental protection, etc.

The current LED lamps perform light-diffusion by providing a light-diffusion lampshade thereon. However, the current light-diffusion lampshade has a poor light-diffusion effect and an unstable luminous-flux and color-temperature; meanwhile, the current LEDs mostly diffuse light by employing a relatively large volume of aluminum block, which increases the use of materials and cost.

SUMMARY

In order to address such above technical problems, the present patent application provides a light-diffusion LED lamp having novel structure, excellent light-diffusion effect and obvious heat-dispersion effect.

In order to solve the technical problems, the light-diffusion LED lamp according to the present patent application includes LED blue light chips and light-guiding column, wherein a substrate of the LED blue light chips is provided with a blocking wall which is made of reflective heat-conducting materials, chips are provided within the blocking wall, an upper surface of the substrate within the blocking wall is covered with a transparent heat-conducting layer, a lower portion of the transparent light-guiding column is attached with a cover plate, a bottom surface of which is provided with stepped grooves that match with the LED blue light chips, the side wall of a second stepped groove thereof and the upper surface of the cover plate are provided with a light reflective layer, the top surface of which is coated with a fluorescent layer, the top portion of the transparent light-guiding column has a reflective structure mounted thereon, and the fluorescent layer is in non-contact with the LED blue light chips.

Preferably, the reflective structure is a hollow cavity or a reflective shade having a regular geometric or irregular geometric hollow cavity or reflective shade that is provided on the top portion of the transparent light-guiding column. Such design having relatively good adaptability and selectivity can be set according to various demands of light-diffusion effects Preferably, the hollow cavity is formed in a shape of cone, sphere, regular polyhedron or irregular polyhedron, and a reflective layer is provided in the hollow cavity or on the bottom surface of the reflective shade. Such design can obtain an effective light-diffusion.

Preferably, the reflective heat-conducting material is heat-conducting plastic or metal with a plated surface or UV paint, wherein the UV paint is an ultraviolet curing paint which is a coating that can rapidly curing into film in seconds under the irradiation of ultraviolet (abbreviated as UV). Such design can obtain an excellent reflective effect.

Preferably, the substrate is made of ceramics or aluminum. Such design can obtain a relatively good heat-dispersion effect; meanwhile, the plate-shaped substrate has advantages of reduced materials and costs.

Preferably, the transparent heat-conducting layer can be formed into concave lens, plane lens or convex lens. Such design can realize light-distribution at one time.

Preferably, the transparent light-conducting column is made of acrylic or polycarbonate. Such design can obtain a relatively good light-penetrating effect.

Preferably, the above fluorescent layer can be coated outside or coated inside or fill in the transparent light-guiding column.

Preferably, the above transparent heat-conducting layer is made of silicon rubber or epoxy resin.

The advantageous effects of the present patent application are as follows:

1. Obtaining an effect of light-diffusion at an angle of larger than 270 degrees and obtaining light-distribution effects of different curves according to different shapes of "V" and different shapes of transparent silicon rubber layer, thus the problem of glaring may be eliminated;

2. The chips being in non-contact with the fluorescent layer, the chips being protected by a transparent silicon rubber layer and the blocking wall being made of reflective heat-conducting materials, such that both chips and fluorescent powder have characteristics of reduced heat concentration and good heat dispersion, thus improving the light flux, color temperature, stability of the electrical parameter of the whole system, and at the same time decreasing the light attenuation while increasing the light flux maintenance ratio; and 3. The configuration of separating the fluorescent powder and the chips facilitating the detachment of chips and supply of fluorescent powder of the transparent shade, so as to easily control the consistency of the product and make chromatic aberration of the product reduced.

BRIEF DESCRIPTIONS OF THE DRAWINGS

Further Description of the light-diffusion LED lamp according to the present patent application is made with reference to the accompanying drawings, in which.

Figure 5:
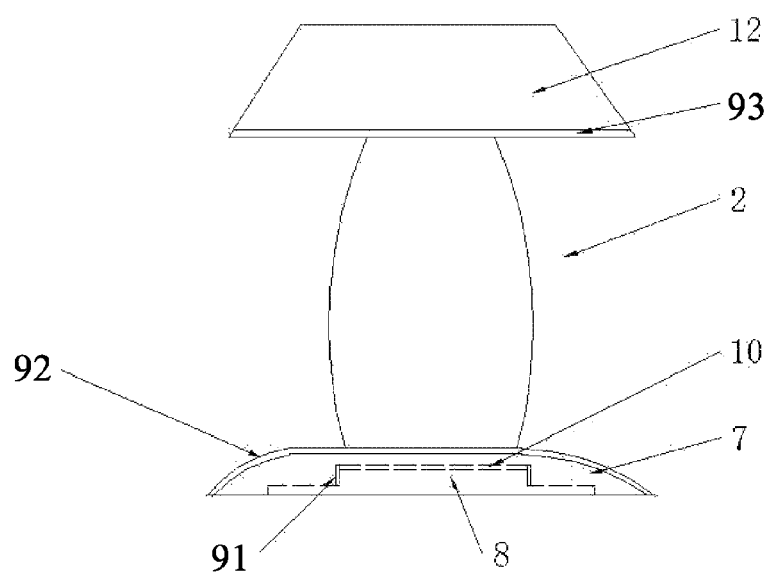

FIG. 5 a perspective view of the transparent light-guiding column according to the second embodiment of the present patent application;

In the figures, reference numeral 1 indicates LED blue light chips; reference numeral 2 indicates a transparent light-guiding column; reference numeral 3 indicates a substrate; reference numeral 4 indicates a blocking wall; reference numeral 5 indicates chips; reference numeral 6 indicates transparent heat-conducting layer; reference numeral 7 indicates a cover plate; reference numeral 8 indicates a second stepped groove; reference numeral 9 indicates a reflective layer; reference numeral 10 indicates a fluorescent layer; reference numeral 11 indicates a hollow cavity; reference numeral 12 indicates a reflective shade.

DETAILED DESCRIPTION

First Embodiment

Figure 1:
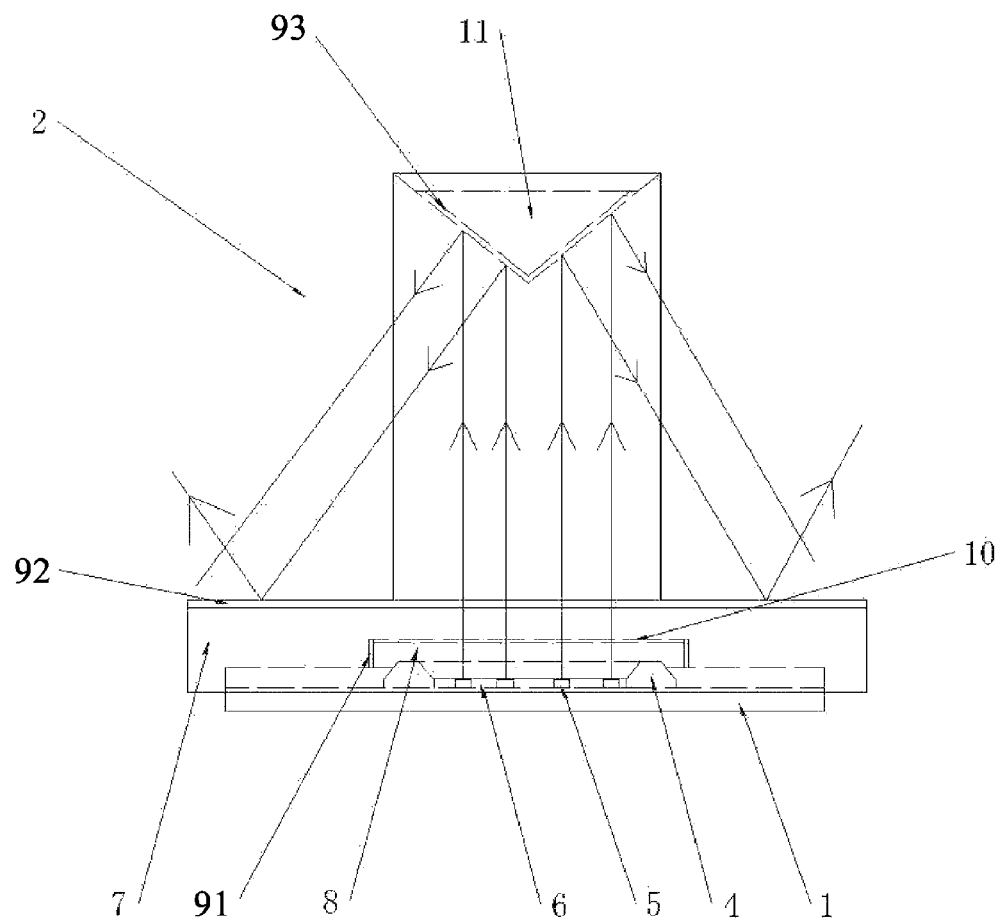
FIG. 1 is a principle view according to a first embodiment of the present patent application.
Figure 2:
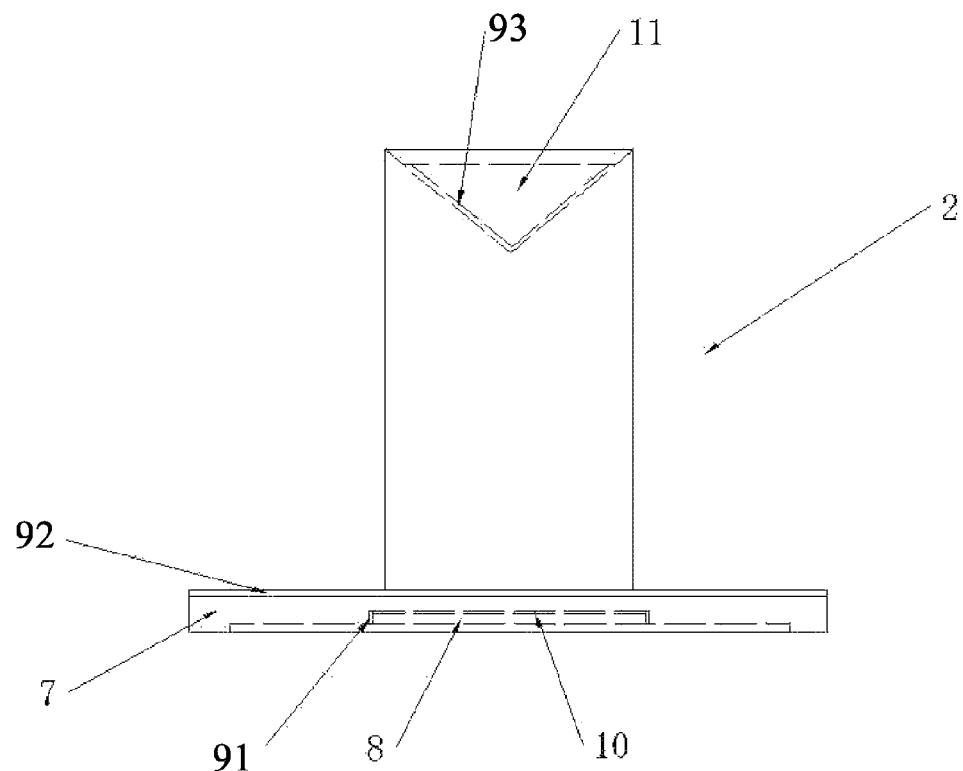
FIG. 2 is a perspective view of the transparent light-guiding column according to the first embodiment of the present patent application.
Figure 3:
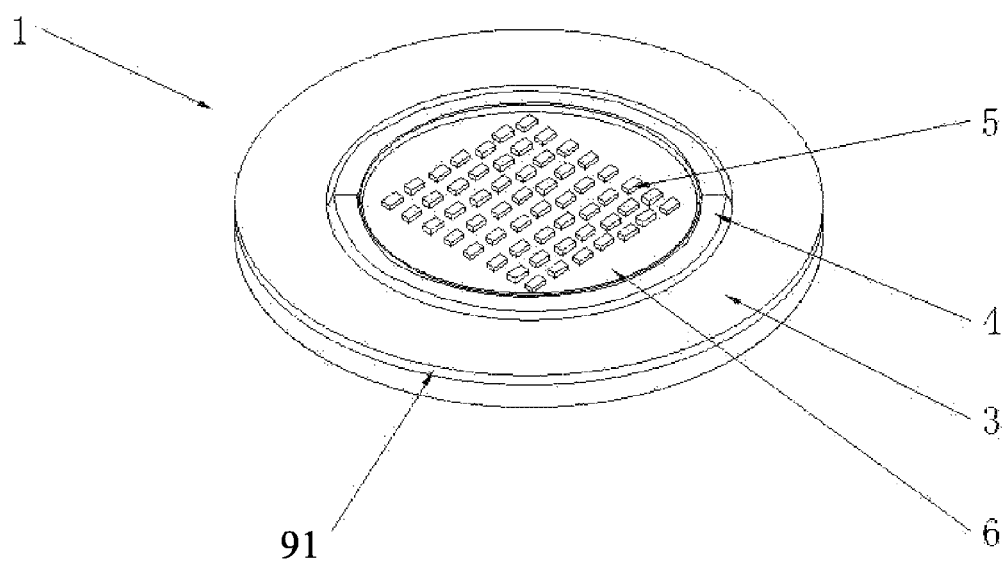
FIG. 3 is a schematic structural perspective view of the LED blue light chips according to the present patent application.

As shown in FIGS. 1-3, the light-diffusion LED lamp according to the present patent application includes LED blue light chips 1 and light-guiding column 2, wherein a substrate 3 of the LED blue light chips 1 is provided with a blocking wall 4 which is made by plating silver onto its surface of heat-conducting plastic, chips 5 are provided within the blocking wall 4, and an upper surface of the substrate 3 within the blocking wall 4 is covered with a transparent heat-conducting layer 6. A lower portion of the transparent light-guiding column 2 is attached with a cover plate 7, a bottom surface of which is provided with stepped grooves that match with the LED blue light chips 1. The side wall of a second stepped groove 8 is provided with a first light reflective layer 91 and the upper surface of the cover plate 7 is provided with a second light reflective layer 92. A top surface of the second stepped groove is coated with a fluorescent layer 10. The top portion of the transparent light-guiding column 2 has a reflective structure mounted thereon. The fluorescent layer is in non-contact with the LED blue light chips.

In this embodiment, the substrate 3 is made of ceramics. The reflective structure is a cone shaped hollow cavity 11, the inner surface of which is provided with a third reflective layer 93 that reflects light excited by chips 5. In this embodiment, chips 5 means the blue light chips 5.

The transparent heat-conducting layer 6 covering on the substrate 3 in the blocking wall 4 is formed into a plane mirror, so that the light excited by chips 5 can be reflected as reflection light.

The transparent light-guiding column 2 according to this embodiment is made of acrylic.

The stepped grooves provided on the bottom surface of the cover plate 7 are 2-stepped grooves, the first stepped groove thereof matches with the substrate 3, the second stepped groove 8 matches with the outer ring that is provided on the blocking wall 4 of the substrate 3. The depth of the second stepped groove 8 is deeper than the height of the blocking wall 4. The top surface of the above second stepped groove 8 is coated with the fluorescent layer 10 of the fluorescent powder.

White light, generated by exciting the fluorescent powder using the blue light of the blue light chips 5, is reflected downward through the third reflective layer 93 of the cone-shaped hollow cavity 11 and then is diffused once a time through the second reflective layer 92 that is provided on the upper surface of the cover plate 7, and finally obtain a light-diffusion effect.

The first reflective layer 91, the second reflective layer 92 and the third reflective layer 93 according to this embodiment are metal plated surface, the substrate material of which may be selected from fine copper, copper alloy, iron, stainless steel, zinc alloy casting, aluminum and aluminum alloy, etc. The metal in this embodiment is selected to be a fine copper with chrome-plated surface.

The reflective heat-conducting materials can be the same metal as those of the above substrate materials. Electroplated materials such as chrome or brushed nickel can be plated on the surface of the metal.

Second Embodiment

Figure 4:
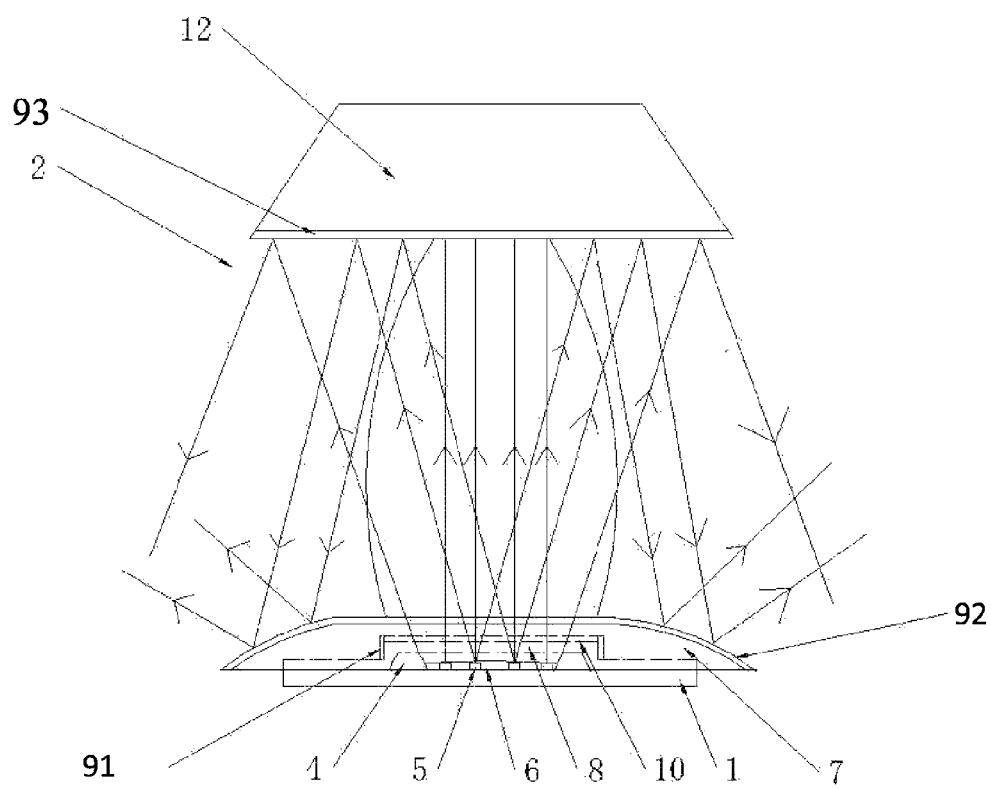
FIG. 4 is a principle view according to a second embodiment of the present patent application.

As shown in FIGS. 3-5, this embodiment is basically identical to the first embodiment, and the differences between them are as follows: the reflective structure in the second embodiment is a reflective shade 12 that is provided on the top portion of the transparent light-guiding column 2. A third reflective layer 93 is provided on the bottom surface of the reflective shade 12 and may be used to reflect the light excited by the chips 5 that are provided in the middle of the LED blue light chips 1. Meanwhile, the outer periphery of the cover plate 7 that is provided at the lower portion of the transparent light-guiding column 2 has a cambered surface. The cambered surface diffusely reflects light which is reflected by the second reflective layer 92 at the bottom portion of the reflective shade 12, and thus a diffusion effect is obtained.

In this embodiment, the transparent heat-conducting layer 6 inside the blocking wall 4 that is provided on the upper surface of the substrate 3 forms into a convex lens. Meanwhile, the transparent light-guiding column 2 is made of polycarbonate, and the cover plate 7 thereof forms integrally with the transparent light-guiding column 2.

The blocking wall 4 in this embodiment is made of copper with brushed nickel plated on the surface thereof.

Third Embodiment

This embodiment is basically identical to the first embodiment, and the differences between them are as follows: in third embodiment, the substrate 3 of the LED blue light chips 1 with which the cover plate 7 matches is made of aluminum, and the blocking wall 4 disposed on the substrate 3 is made of copper alloy with brushed nickel plated on the surface thereof, thus obtaining an excellent reflection effect.

In this embodiment, the reflective structure disposed on the top portion of the transparent light-guiding column 2 is a hollow cavity 11 having an irregular geometric, within which the third reflective layer 93 made of copper alloy with brushed nickel plated on the surface thereof, is provided.

The transparent heat-conducting layer 6 disposed within the blocking wall 4 is formed into a concave lens so as to distribute light at one time.

The above embodiments are merely preferable embodiments of the present patent application. A person skilled in the art should note that various improvements and modifications can be made to the present patent application without deviating from the technical principle of the present patent application. Those improvements and modifications should also be regarded as protection scope of the present patent application.

I claim:

1. A light-diffusion LED lamp, comprising LED blue light chips and a transparent light-guiding column, a substrate of the LED blue light chips is provided with a blocking wall which is made of reflective heat-conducting materials, an upper surface of the substrate within the blocking wall is covered with a transparent heat-conducting layer, a lower portion of the transparent light-guiding column is attached with a cover plate, a bottom surface of which is provided with a plurality of stepped grooves, each of the plurality of stepped grooves overlaps the LED blue light chips in a direction perpendicular to the plane of the substrate of the LED blue light chips, a side wall of a second stepped groove thereof is provided with a first light reflective layer and an upper surface of the cover plate is provided with a second light reflective layer, a top surface of the second stepped groove is coated with a fluorescent layer, a top portion of the transparent light-guiding column has a reflective structure mounted thereon, and the fluorescent layer is in non-contact with the LED blue light chips; and wherein the reflective structure is a hollow cavity provided on the top portion of the transparent light-guiding column; a third light reflective layer is provided in an inner surface of the hollow cavity;

wherein the blocking wall is in a shape of a circle and the entire blocking wall is made of a heat-conducting plastic, and silver is plated onto one of the surfaces of the blocking wall;
the transparent heat-conducting layer is formed into a plane mirror;
wherein the LED blue light chips emit light to the transparent light-guiding column, the light reflects off the third reflective layer in a downward direction and then diffuses by reflecting off the second reflective layer of the upper surface of the cover plate in an upward direction, and finally obtains a light-diffusion effect.

2. The light-diffusion LED lamp according to claim 1, wherein the hollow cavity is formed in a shape of a cone.

3. The light-diffusion LED lamp according to claim 1, wherein the substrate is made of ceramics or aluminum.

4. The light-diffusion LED lamp according to claim 1, wherein the transparent light-guiding column is made of acrylic or polycarbonate.

5. The light-diffusion LED lamp according to claim 1, wherein the fluorescent layer must only be capable of coating a surface external to the transparent light-guiding column.

6. The light-diffusion LED lamp according to claim 1, wherein the transparent heat-conducting layer is made of silicon rubber or epoxy resin.

7. The light-diffusion LED lamp according to claim 1, wherein a depth of the second stepped groove is deeper than a height of the blocking wall; the depth of the second stepped groove is the vertical distance between the top surface of the second stepped groove and the substrate, and the height of the blocking wall is measured from the substrate to the most vertically extended point on the blocking wall.

8. A light-diffusion LED lamp, comprising LED blue light chips and a transparent light-guiding column, a substrate of the LED blue light chips is provided with a blocking wall which is made of reflective heat-conducting materials, an upper surface of the substrate within the blocking wall is covered with a transparent heat-conducting layer, a lower portion of the transparent light-guiding column is attached with a cover plate, a bottom surface of which is provided with a plurality of stepped grooves, each of the plurality of stepped grooves overlaps the LED blue light chips in a direction perpendicular to the plane of the substrate of the LED blue light chips, a side wall of a second stepped groove thereof is provided with a first light reflective layer and an upper surface of the cover plate is provided with a second light reflective layer, a top surface of the second stepped groove is coated with a fluorescent layer, a top portion of the transparent light-guiding column has a reflective structure mounted thereon, and the fluorescent layer is in non-contact with the LED blue light chips;
wherein the blocking wall is in a shape of a circle and the entire blocking wall is made of copper, and brushed nickel is plated onto one of the surfaces of the blocking wall; and
wherein the reflective structure is a reflective shade provided on the top portion of the transparent light-guiding column; a third light reflective layer is provided on a bottom surface of the reflective shade, an outer periphery of the cover plate that is provided at the lower portion of the transparent light-guiding column has a cambered surface; the LED blue light chips emit light to the transparent light-guiding column, the light travels to the third reflective layer at a bottom portion of the reflective shade, the light reflects off the third reflective layer in a downward direction and then diffuses by reflecting off the second reflective layer of the cambered surface in an upward direction, and finally obtains a light-diffusion effect.

9. The light-diffusion LED lamp according to claim 8, wherein the substrate is made of ceramics or aluminum.

10. The light-diffusion LED lamp according to claim 8, wherein the transparent light guiding column is made of acrylic or polycarbonate.

11. The light-diffusion LED lamp according to claim 8, wherein the fluorescent layer must only be capable of coating a surface external to the transparent light-guiding column.

12. The light-diffusion LED lamp according to claim 8, wherein the transparent heat-conducting layer is made of silicon rubber or epoxy resin.

13. The light-diffusion LED lamp according to claim 8, wherein a depth of the second stepped groove is deeper than a height of the blocking wall; the depth of the second stepped groove is the vertical distance between the top surface of the second stepped groove and the substrate, and the height of the blocking wall is measured from the substrate to the most vertically extended point on the blocking wall.

14. A light-diffusion LED lamp, comprising LED blue light chips and a transparent light-guiding column, a substrate of the LED blue light chips is provided with a blocking wall which is made of reflective heat-conducting materials, an upper surface of the substrate within the blocking wall is covered with a transparent heat-conducting layer, a lower portion of the transparent light-guiding column is attached with a cover plate, a bottom surface of which is provided with a plurality of stepped grooves, each of the plurality of stepped grooves overlaps the LED blue light chips in a direction perpendicular to the plane of the substrate of the LED blue light chips, a side wall of a second stepped groove thereof is provided with a first light reflective layer and an upper surface of the cover plate is provided with a second light reflective layer, a top surface of the second stepped groove is coated with a fluorescent layer, a top portion of the transparent light-guiding column has a reflective structure mounted thereon, and the fluorescent layer is in non-contact with the LED blue light chips; and
wherein the reflective structure is a hollow cavity provided on the top portion of the transparent light-guiding column; a third light reflective layer is provided in an inner surface of the hollow cavity;
wherein the blocking wall is made of copper alloy with brushed nickel plated on the surface thereof;
wherein LED blue light chips emit light to the transparent light-guiding column, the light reflects off the third reflective layer in a downward direction and then diffuses by reflecting off the second reflective layer of the upper surface of the cover plate in an upward direction, and finally obtains a light-diffusion effect.

* * * * *